United States Patent [19]
Kofink et al.

[11] Patent Number: 6,158,132
[45] Date of Patent: Dec. 12, 2000

[54] STEERING-ANGLE SENSOR GIVING ABSOLUTE VALUES

[75] Inventors: Peter Kofink, Ingersheim; Harald Traub, Leingarten, both of Germany

[73] Assignee: ITT Manufacturing Enterprises, Inc., Wilmington, Del.

[21] Appl. No.: 09/029,436

[22] PCT Filed: Jun. 29, 1996

[86] PCT No.: PCT/EP96/02846

§ 371 Date: May 18, 1998

§ 102(e) Date: May 18, 1998

[87] PCT Pub. No.: WO97/09588

PCT Pub. Date: Mar. 13, 1997

[30] Foreign Application Priority Data

Sep. 7, 1995 [DE] Germany ............................ 195 32 903

[51] Int. Cl.⁷ .................................................. G01B 11/26
[52] U.S. Cl. ................................................................ 33/1 PT
[58] Field of Search ................................... 33/1 N, 1 PT, 33/706, 707

[56] References Cited

U.S. PATENT DOCUMENTS

| 4,625,411 | 12/1986 | Kashiwagi et al. ................... 33/1 PT |
| 5,129,725 | 7/1992 | Ishizuka et al. ....................... 33/707 |
| 5,435,067 | 7/1995 | Uchida et al. ......................... 33/1 PT |
| 5,442,858 | 8/1995 | Wolters et al. ........................ 33/707 |

FOREIGN PATENT DOCUMENTS

| 0377097 | 7/1990 | European Pat. Off. . |
| 0557265 | 2/1993 | European Pat. Off. . |
| 2436126 | 2/1975 | Germany ................. 33/1 PT |
| 3903359 | 8/1990 | Germany . |
| 4009007 | 9/1990 | Germany . |
| 4015099 | 11/1990 | Germany . |
| 4220502 | 12/1993 | Germany . |
| 4228719 | 3/1994 | Germany . |
| 4243778 | 6/1994 | Germany . |
| 4344290 | 7/1995 | Germany . |
| WO 84/00261 | 1/1984 | WIPO ..................... 33/1 PT |

*Primary Examiner*—G. Bradley Bennett
*Attorney, Agent, or Firm*—J. Gordon Lewis

[57] ABSTRACT

The invention relates to a steering angle sensor for motor vehicles. The object of the invention is to be able to provide the absolute value of the steering angle position of the steering wheel within a relatively short angle of rotation of the steering wheel. To this end, the invention proposes featuring two preferably concentric circular tracks (1, 2), wherein the first track (1) is used to determine the relative angular movement of the steering wheel and the second track (2) is used to provide the absolute value of the angle position. Advantageous further developments relate to two different coding options.

20 Claims, 2 Drawing Sheets

STEERING-ANGLE SENSOR GIVING ABSOLUTE VALUES

BACKGROUND OF THE INVENTION

Motor vehicles are increasingly being equipped with aids which are designed to correct and/or prevent incorrect driving behavior on the part of the person operating the vehicle. For example, one of the measures currently available prevents locking of braked wheels. Other measures consist in providing assistance whenever a vehicle threatens to run off track as a result of a curve being taken too tightly. In order that correction moments which keep the vehicle on track can be applied in conjunction with this so-called yawing moment control system, it is important that the control system be informed of the radius within which the driver intends to operate the vehicle. This is achieved with the help of a steering angle sensor. It should also be noted that the wheel angle is not yet known when the system is switched on, i.e., when power is supplied to the system by turning the ignition key. Consequently, the actual angle of the wheels cannot be obtained by simply adding or subtracting relevant incremental angle changes. Instead, continuous absolute readings must be taken to provide the control system with precise information on the actual angle of the wheels.

It is known that the aforementioned incremental steering angle sensors, which routinely consist of two sensors, cannot provide an absolute steering angle on their own. An additional third sensor (zero point sensor) is needed to provide an absolute steering angle once the circular scanning track has completed a 360 degree rotational movement. This results from the inclusion of a marking on this absolute track which defines the zero point and which is used to calculate the measured absolute reading.

The reference signal obtained in this manner is not confirmed until an additional 360 degree rotation has been completed. Even in the event that the angle of rotation of the steering wheel is very much larger than the angle of rotation of the applicable wheel, the described procedure for obtaining an absolute wheel angle reading is not sufficient for some applications in the vehicle.

The object of the invention is to design a steering angle sensor in such a way that an absolute steering angle value can be determined with simple means and after a relatively small rotational movement.

SUMMARY OF THE INVENTION

The object of the invention is achieved by a first track that features equidistant teeth, by means of which the size of a relative angular movement can be determined, and by a second track that is used to determine the absolute angle position of the steering wheel, wherein the two tracks, which are rotatable in relation to a frame, are spatially allocated to the steering wheel, the absolute angle position of which is to be determined. Thus, in principle the invention consists in the ability to determine the absolute value of the steering angle on the basis of only two information tracks, wherein the first track is used to measure the absolute values which are detectable on the second track.

In an advantageous further development of the invention designed to provide for greater resolution of the incremental readings taken along the first track, the first track (incremental track) is measured by two sensors which scan the evenly spaced flanks of the preferably rectangular teeth along the first track. The teeth and the corresponding gaps are of identical widths. Assuming that the space between two rising flanks is 360 degrees and, consequently, the space between two successive flanks is 180 degrees, the two sensors should be arranged in successive order and 90 degrees apart. Thus, the two sensors facing the first track can generate two signals which are offset by 90 degrees; if the direction of rotation is reversed, one of these signals undergoes a 180 degree phase shift, so that the direction of rotation is also clearly detectable.

According to an advantageous further development of the invention, a single detector which scans the second track and displays the absolute value is sufficient for purposes of determining the absolute value. However, for reasons of enhanced safety and greater precision, it may be advisable to provide a fourth detector which scans the second track.

A special analysis device is recommended for purposes of obtaining an actual display of the absolute steering angle value. In principle, this involves using the teeth on the first track to measure the flank spacing on the second track. Conversely, it is important for the invention that there be a clear relationship between the spaces between the successive flanks on the second track and the absolute value of the steering angle being measured. In other words, the width of a tooth on the second track is a measure for the steering angle which the wheels cover in the space required to measure the tooth.

To ensure that the concrete value of the angle can be easily obtained the number of teeth serves as the input value for a table which provides the value of the angle as the corresponding output value.

The yawing moment control system is particularly important at high speeds, i.e., speeds at which the steering angle set by the driver is likely to relatively small. To ensure that the absolute value can be quickly provided at such small steering angles, it is recommended as a further development of the invention that the tooth widths of the individual teeth on the second track (absolute track) vary to correspond to the applicable measured absolute values, the narrow teeth are placed in the vicinity of the absolute track, which is located in proximity to the absolute zero value of this track.

Instead of exclusively measuring the width of a tooth on the absolute track, with measuring time varying as a factor of tooth width, the measured arc length of the second track can be used to determine the absolute value which is always the same. In other words, the incremental track establishes the width of a bit map on the absolute track, with the individual teeth on the incremental track 1 determining the position of the individual bits on the code track 2. Thus, the incremental track determines the positions on the code track where the amplitude reading taken on that track should be recorded as the bit value of a code.

To allow for easy conversion of the measured code value into a concrete angle value, the coded bit map of the second track is processed by a table transforming it into an absolute steering angle value.

A particularly simple mechanical construction results if the tracks consist of two concentrically arranged circular protrusions equipped with teeth. This type of design requires very little space and is relatively easy to manufacture using plastic casting technology. Allocating 8 bits of an 8-bit code to the second track via two tooth periods of the first track has proven to be particularly advantageous in terms of the bit coding. By using two sensors facing the first track, the width of two teeth and the gaps pertaining to these teeth can be divided into eight time segments to which 8 bits of an 8-bit code are allocated on the second track. This provides for a very straightforward design of the sensor tracks.

To obtain a particularly dense sequence of absolute readings, each of the code values, which consists of a predetermined number of bits and is indicated on the second track, differs from the remaining code values indicated on the second track. In principle, this measure ensures that there are no identical bit sequences (e.g., every 8 bits), regardless of the starting point on the second track. Although this process is known in the art (PWM coding), it has proven to be particularly effective and useful in connection with the sensor used here.

The number of teeth has been proven effective in terms of practical design. The sensor according to the invention is small in terms of its spatial dimensions. This allows for inclusion of the volute spring in the sensor casing, thus largely protecting it from environmental effects. Optical detectors, in which the teeth of the rotating tracks shield a glowing diode from a detector or, conversely, in which the gaps between the teeth expose the diode, have proven to be particularly effective. The resulting changes in illumination are measured by an optical receiver. However, magnetic detectors (Hall probes) or other sensors may also be used.

The diminutive dimensions of the sensor according to the invention allow for an advantageous further development of the invention, if the sensor is installed in the casing of a steering column switch of the motor vehicle. This sensor may, for example, encase the steering column of the vehicle and itself be encased by the steering column switch of the vehicle.

An embodiment of the invention is described below on the basis of the figures.

DETAILED DESCRIPTION OF THE DRAWINGS

Figure 1:
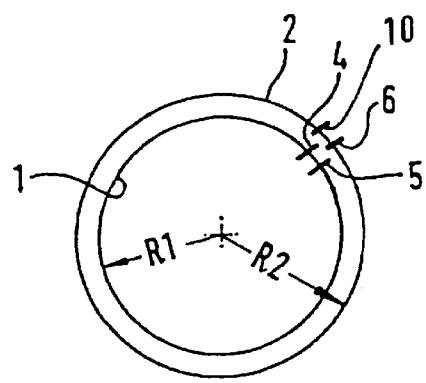
FIG. 1 depicts, in outline form, an aerial view of two concentrically arranged sensor tracks.

FIG. 1 depicts, in outline form, an aerial view of two concentrically arranged sensor tracks, where the first track (incremental track) is positioned on the inside and is enclosed by the second track with a space between the two tracks.

Figure 2:
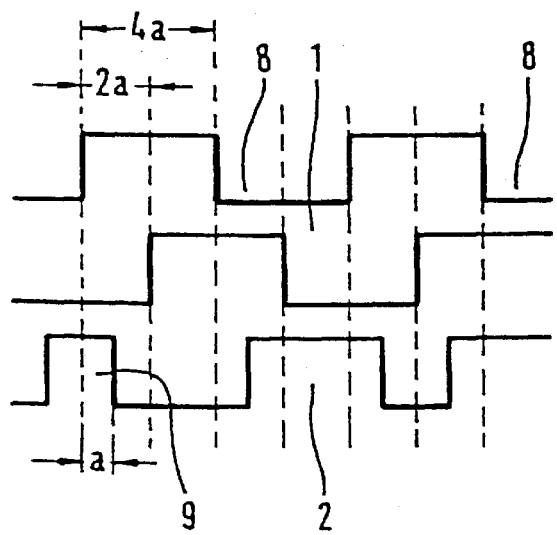
FIG. 2 depicts the electric signals emitted by the detectors directed toward the tracks.

The first track 1 is scanned with two detectors 4 and 5, while a third detector scans the second track 2 (absolute value track). The first track has a radius R1, while the second track has a radius R2, so that the two tracks remain continually equidistant from one another. In fact, it is possible to scan the incremental track 1 with only one detector. As is evident in FIG. 2, the use of two detectors to scan the rectangular teeth 7, each of which is adjacent to uniform gaps, is advantageous. If a 360 degree angle is assigned to each periodic gap-and-tooth sequence, a 180 degree angle applies to each tooth and to each gap, as the teeth and gaps are of the same width. If we assign an angle of $4\alpha$ to the flank space on one tooth or one gap, then the angle $\alpha$ comprises 45 degrees. The two detectors 4 and 5 are now positioned at a distance of 90 degrees or $2\alpha$ from the track 1. This ensures that two signals offset by 90 degrees can be generated at the detectors 4, 5, as depicted by the two upper signal paths in FIG. 2. The direction of rotation is clearly detectable, as one of the signals experiences a 180 degree phase shift when the direction of rotation is reversed. For measurement reasons, the flanks of the code track at the output of detector 6 are offset by an angle $\alpha$ in relation to the flanks of the two incremental tracks (detectors 4 and 5).

Figure 3:
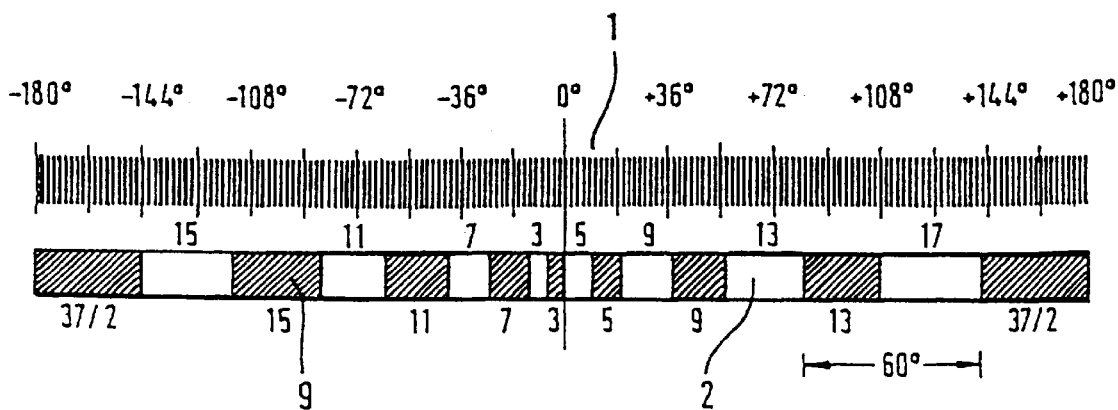
FIG. 3 depicts the layout of the two tracks in one plane in terms of an initial embodiment.

It is evident in FIG. 3 that the teeth 9 of the code track (detector 6) vary in length. As each tooth width only occurs once along the entire length of track 2, the tooth width provides information about the absolute value of the position of the track in relation to the fixed detectors. As explained earlier, the position of the code track is a measure for the angle of the wheels or for the steering angle. As the tooth widths of track 2 are at their smallest when steering angles are close to 0 degrees, which is most commonly the case and is particularly true at high speeds, information on the absolute value of the steering angle can be obtained relatively quickly.

Figure 4:
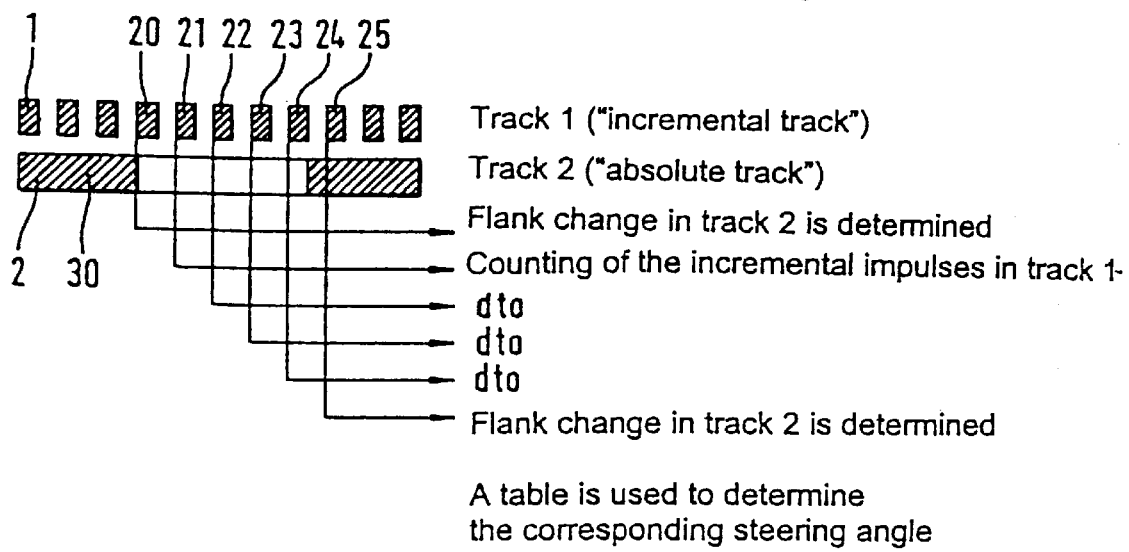
FIG. 4 depicts the analysis of the impulses generated by scanning the tracks.

FIG. 4 shows how the widths of the individual teeth on code track 2 can be measured. As is evident in FIG. 4, it can be determined at the beginning of tooth 20 that the end of a tooth 30 has been reached and that a flank change is occurring. No flank changes are detected when teeth 21, 22, 23, and 24 are passed subsequently. A flank change on the code track 2 is not detected until tooth 25 appears on the incremental track 1. This leads to the conclusion that the tooth and/or the adjacent gap on the code track must be larger than the span of four teeth on the incremental track. Theoretically, the measured code tooth may be as wide as six incremental teeth.

Once the length of the applicable tooth on the code track has been established, with allowances made for tolerances, the result is entered into a table not shown in the figure, which then yields the absolute value of the steering angle. The various widths of the teeth or gaps on the code track 2 are listed in FIG. 3. In the embodiment based on FIG. 3, there are nine teeth on the code track and 180 teeth on the incremental track. The table may consist of an ROM table in the analyzing microprocessor of the sensor.

Thus, it is evident that the use of the second sensor 5 in conjunction with the information track 2 allows for determination of the continuous sector after a maximum rotational movement of only <30 degrees. As a result, the absolute steering angle values can be provided very quickly.

Thus, the mode of operation is as follows: When the ignition is turned on, the incremental impulses are counted and the direction of rotation is established. In addition, the light-dark portion of the remaining information track is measured using the impulse sequences on track 1; the absolute angle reading is based on the length of the light-dark section. Consequently, a precise absolute steering angle becomes available within a very short time after "ignition", while the analyzing mechanism is moved into the so-called ECU, i.e., the attached microprocessor.

In terms of measurement precision, it should be noted that the shortest possible segments of the code track (track 2) are arranged near the zero-degree position of the steering wheel. This is where the fastest synchronization and smallest possible absolute error occurs. The greatest possible steering wheel movement at which clear information on the current absolute steering angle cannot be provided is 30 degrees. However, it is possible to obtain an estimate of the absolute steering angle by applying the appropriate software algorithms.

The code sequence proposed in conjunction with the first embodiment consists of the following light-dark sequences:

36, 27, 34, 53, 26, 45, 23, 43, 15, 17, 22, 41, 16, 13, 31, 33, 62, 51, 21, 42, 14, 44, 24, 12, 25, 54, 32, 35. Each pair of numbers only occurs once in this numerical sequence. Thus, a clear allocation of numerical sequence and angle position is possible during right-to-left movement or when a complete light-dark or dark-light phase is exceeded.

As described below, the use of PWM coding along the perimeter of the info track ensures that the minimum rotational movement needed to determine the sector remains constant. This will be explained on the basis of a second embodiment.

Figure 5:
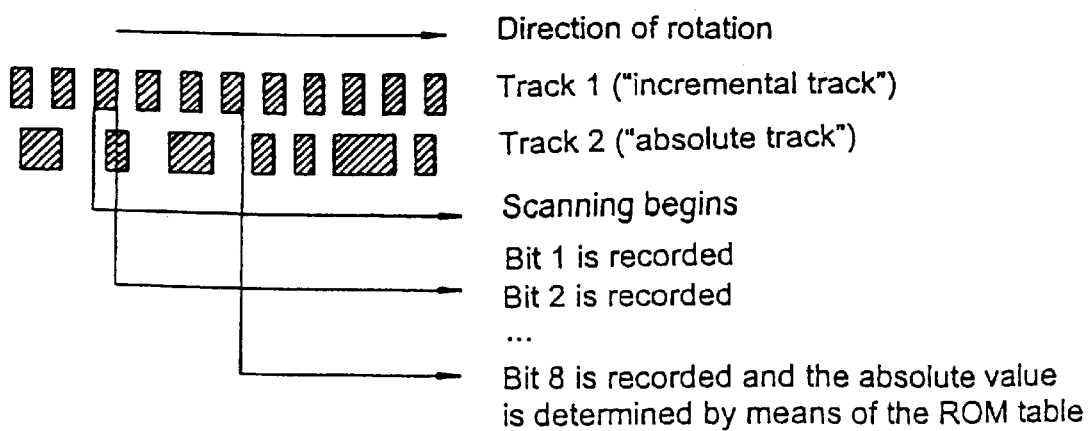
FIG. 5 depicts, in a second embodiment, the analysis of the impulses obtained by scanning the tracks.

In the following text, a second embodiment is described on the basis of FIG. 5. This embodiment is characterized by the fact that the minimum rotational movement needed to determine the applicable absolute angle remains constant. In principle, a certain number of teeth are specified on the track 1 and, when these teeth are passed on the first track, the light-dark changes on the code track 2 are evaluated (absolute track). Thus, the light-dark sequence on the code track corresponds to a specific code. In other words, whenever a tooth is passed on the first track, the system is able to determine whether the track 2 is light or dark. A digital value of 1 is assigned to light and a digital value of 0 to dark. In this manner, we obtain an 8-bit coded number which represents the immediate absolute value of the steering angle. By selecting suitable digital numbers, it is possible to ensure that a digital number will always result, regardless of which tooth on the incremental track is used to begin the analysis of the corresponding digital number (8 bits in length) on track 2. Once this digital number has been analyzed, the aforementioned ROM memory yields the absolute value of the steering angle. Thus, once the ignition has been turned on the incremental impulses are counted and the direction of rotation is determined. Furthermore, the absolute value of the steering angle is determined when the light-dark changes on the code track 2 are recorded and decoded via ROM tables in the analyzing microprocessor. In this case, a precise absolute steering angle also becomes available shortly after ignition. During vehicle operation, the number of increments at the end of each synchronization determines the steering angle, which is verified constantly with the information from the absolute track. Thus, to a certain extent the sensor is redundant or intrinsically safe. A clear absolute steering angle is always available once the steering wheel has complete a 16 degree movement. It is preferable to select a so-called maximum sequence as the code sequence. Its resolution amounts to 8 bits. A complete sequence consists of 180 bits, with each 8-bit sequence only occurring once along the entire perimeter. An additional increase in precision can be achieved through the use of a second detector on the information track. This applies to both embodiments. Thus, neither of the two embodiments requires a static current supply, and both optical and magnetic detector units can be used.

What is claimed is:

1. A steering angle sensor for determination of an absolute value of a steering angle, with a first circular track for determining a relative angular movement, the first track including a periodic tooth cap sequence having adjacent teeth and gaps of equal width, the width divided into four equal angular sectors, each sector having a predetermined angle α, a second circular track for determining an absolute angular position, the two tracks rotatable in relation to a frame and coaxially connected to each other, and two detectors emitting pulse sequences permanently mounted in the frame for measuring the relative angular movement of the first track, the detectors spaced from one another angularly by an offset angle equal to two times the predetermined angle α, such that one of the two pulse sequences experiences a phase shift when a direction of rotation is reversed.

2. A steering angle sensor according to claim 1, wherein the second track provides flank spaces increasing in size with an increasing absolute steering angle.

3. A steering angle sensor according to claim 1, wherein a third detector emitting pulse sequences is provided which scans the second track.

4. A steering angle sensor according to claim 3, wherein a fourth detector is provided which scans the second track.

5. A steering angle sensor according to claim 1, wherein a sensor analyzing device counts the number of flanks of at least one of the pulse sequences emitted by the detectors of the first track between two measured flanks of the second track.

6. A steering angle sensor according to claim 3, wherein the number of measured flanks is made available to a table as an input signal and wherein the table provides an output signal corresponding to the absolute value of a steering angle.

7. A steering angle sensor according to claim 5, wherein the sensor analyzing device determines a simultaneously occurring amplitude value of the second track by means of a predetermined number of flanks of one or both pulse sequences of the first track, and wherein the absolute value of a steering angle is forwarded to a coded bit map of the second track.

8. A steering angle sensor according to claim 7, wherein the bit map is made available to a table as an input signal, which issues an output signal that corresponds to the absolute value of a steering angle.

9. A steering angle sensor according to claim 7, wherein each of the code values consists of a predetermined number of bits and is arranged on the second track and differs from the remaining code values arranged on the second track.

10. A steering angle sensor according to claim 7, wherein 8 bits of an 8-bit code are distributed on the second track over two tooth periods of the first track.

11. A steering angle sensor for determination of an absolute value of a steering angle comprising:
a first circular track for determining a relative angular movement, the first track including a periodic tooth gap sequence having adjacent teeth and gaps of equal width, the width divided into four equal angular sectors, each sector having a predetermined angle α;
a second circular track for determining an absolute angular position, the two tracks rotatable in relation to a frame and coaxially connected to each other; and
two detectors each emitting a signal mounted in the frame for measuring the relative angular movement of the first track, the detectors spaced from one another angularly by an offset angle equal to two times the predetermined angle α, such that one of the two signals experiences a phase shift when a direction of rotation is reversed.

12. The steering angle sensor of claim 11, wherein the second track includes a plurality of teeth with radially extending flank surfaces for each tooth wherein spaces between adjacent teeth increase in size with respect to an increasing absolute steering angle.

13. The steering angle sensor of claim 11, including a third detector for emitting a signal to scan the second track.

14. The steering angle sensor of claim 13, including a fourth detector for emitting a signal to scan the second track.

15. The steering angle sensor of claim 13, including a sensor analyzing device for counting the number of flank surfaces of at least one of the signals emitted by the detectors of the first track between two measured flank surfaces of the second track.

16. The steering angle sensor of claim 15, wherein the number of measured flank surfaces is cross-referenced in a look-up table to determine the absolute value of a steering angle.

17. The steering angle sensor of claim 15, wherein the sensor analyzing device determines a simultaneously occurring amplitude value of the second track by means of a predetermined number of flank surfaces of at least one signal of the first track, and wherein the absolute value of a steering angle is forwarded to a coded bit map of the second track.

18. The steering angle sensor of claim 17, wherein the coded bit map is cross-referenced in a look-up table to determine the absolute value of a steering angle.

19. The steering angle sensor of claim 18, wherein each coded bit map consists of a predetermined number of bits, is arranged on the second track, and differs from other coded bit maps arranged on the second track.

20. The steering angle sensor of claim 18, wherein 8 bits of an 8-bit code are distributed on the second track over two tooth gap sequences of the first track.

* * * * *